April 13, 1926.
E. J. McCARTY
AUTOMOBILE JACK
Filed April 8, 1925
1,580,209
2 Sheets-Sheet 1
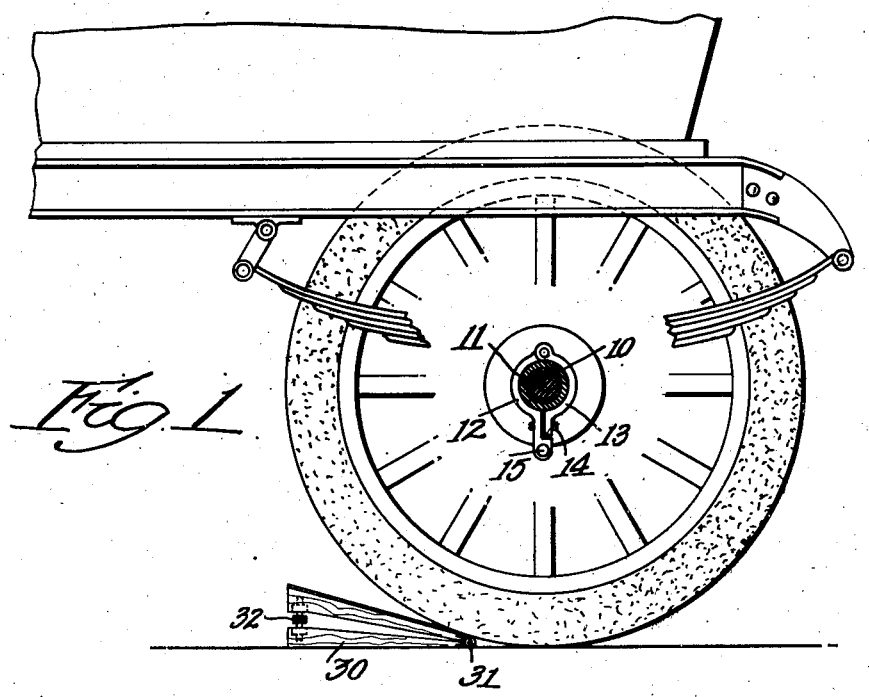
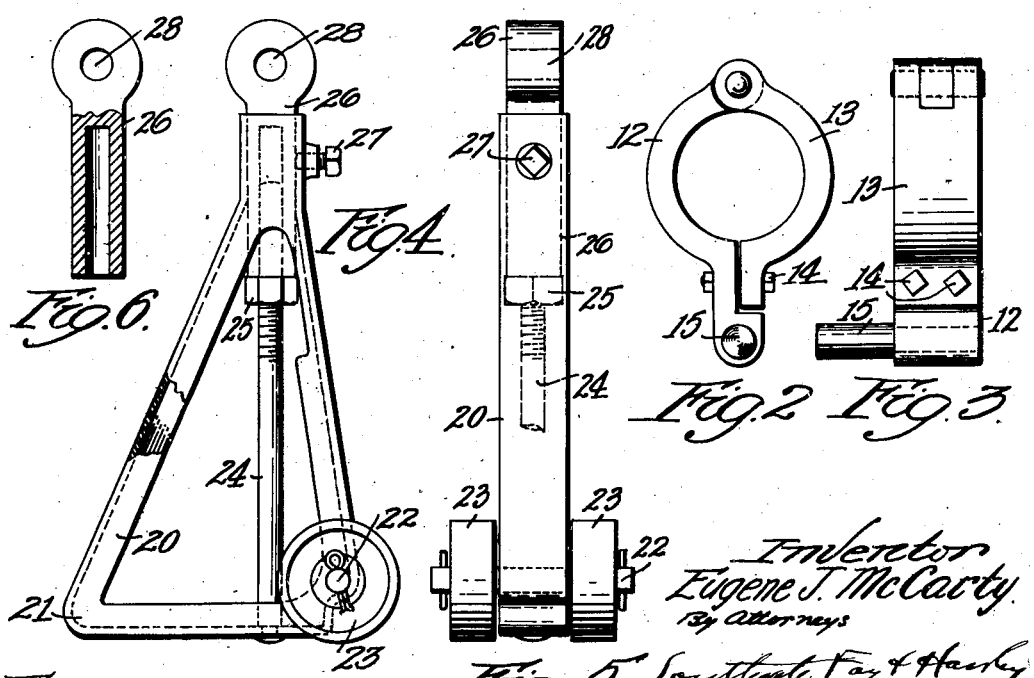
Inventor
Eugene J. McCarty
By Attorneys
Southgate Fay & Hasley April 13, 1926. 1,580,209
E. J. McCARTY
AUTOMOBILE JACK
Filed April 8, 1925 2 Sheets-Sheet 2
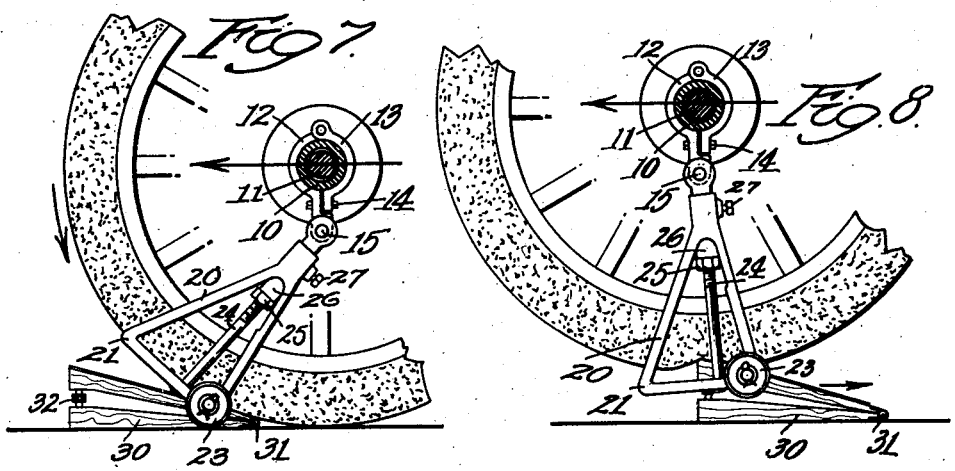
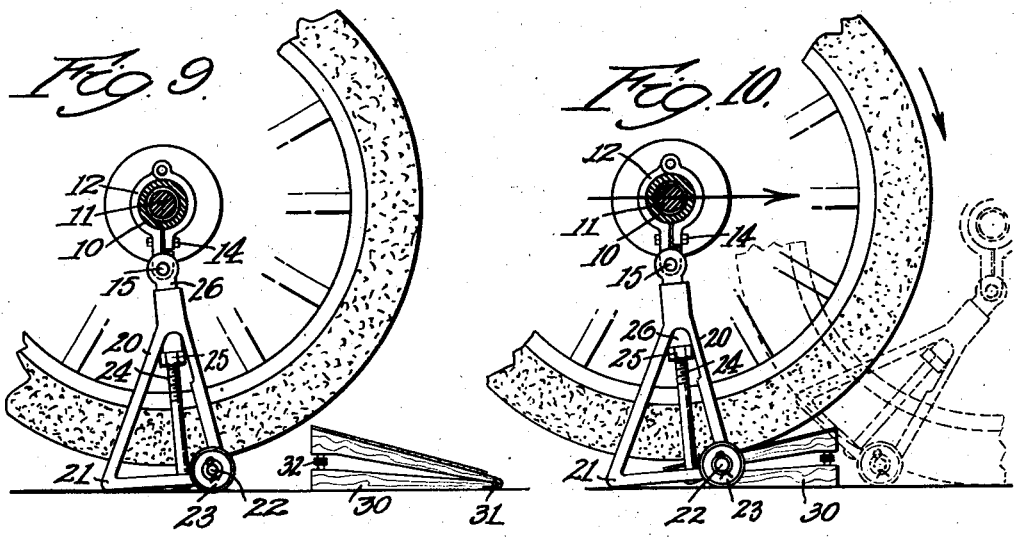
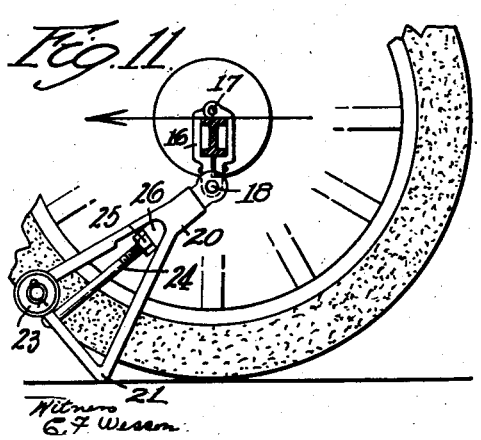
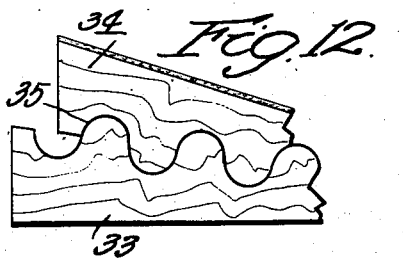
Inventor
Eugene J. McCarty
By Attorneys
Southgate Fay & Hanley
Witness
G. F. Wesson Patented Apr. 13, 1926.

1,580,209

UNITED STATES PATENT OFFICE.

EUGENE J. McCARTY, OF CLINTON, MASSACHUSETTS.

AUTOMOBILE JACK.

Application filed April 8, 1925. Serial No. 21,665.

*To all whom it may concern:*

Be it known that I, EUGENE J. McCARTY, a citizen of the United States, residing at Clinton, in the county of Worcester and State of Massachusetts, have invented a new and useful Automobile Jack, of which the following is a specification.

This invention relates to a jack for an automobile, without any rack or lifting screw or any other system of levers or the like for raising the car, so that the jack can be reduced to its simplest terms and made in very strong form without undue weight. The invention involves a jack pivoted in the vicinity of the axle of the car and hanging down therefrom and co-operating with a block or wedge on which the wheel runs, the parts being relatively arranged in such a manner that the only action required to lift the car by means of the jack is to roll the car along a short distance so that the wheel will ride up on the block or wedge and the jack will automatically come into position to hold the axle up and permit change of tires.

Other objects and advantages of the invention will appear hereinafter.

Reference is to be had to the accompanying drawings, in which

Fig. 1 is a side view of the rear end of a car with the housing in section and showing the use of the wedge or block;

Fig. 2 is an enlarged view of the bracket over the housing for carrying the jack;

Fig. 3 is an edge view of the same;

Fig. 4 is a side view of a preferred form of jack;

Fig. 5 is an edge view thereof;

Fig. 6 is a central sectional view down through the adjustable element of the jack;

Figs. 7, 8 and 9 are views of the rear wheel with the jack attached thereto and shown in three different positions which it occupies in raising the axle and supporting it from the jack, as shown in Fig. 9;

Fig. 10 is a similar view showing the method of releasing the wheel from the jack and letting the car down;

Fig. 11 is a similar view of the front wheel showing the first stage of lifting the front wheel with the same jack; and Fig. 12 is a side view of a modified form of wedge.

This invention relates to a jack which can be attached to the vehicle at any of the four usual places and it is designed to be operated by moving the car instead of working the jack itself. For this purpose I provide around the housing 10 of the rear axle 11 of the car a bracket 12 having a hinged member 13 surrounding the housing and the two parts secured together and fixed to the housing by a bolt 14. This bracket has a horizontal pin 15 located thereon which constitutes a pivot pin for the jack, as will appear. Two of these brackets are secured to the housing at the rear for this purpose. Two other brackets of a similar nature but of different shape, as shown in Fig. 11, are used to be secured to the front axle. Each of these brackets comprises two similar, but right and left hand, members 16 pivoted together above the axle at 17 and secured to the axle by a bolt and carrying a pin 18. These pins 15 and 18 are located in horizontal position and are of cylindrical form so that a jack can swing thereon.

The jack itself consists of a triangular frame 20 made up of three integral bars U-shaped in cross-section or formed in any other way so as to provide a strong construction. At the bottom there is at one end a comparatively sharp point 21 and at the other end is located a stud 22 on which a pair of wheels 23 are mounted to freely rotate. These wheels project down below the lowermost part of the frame so that they will always rest on the ground when the jack is upright, as shown in Fig. 4, or turned over to the right.

Mounted in the frame is a vertical screw threaded rod 24 having a nut 25 thereon adapted to be turned up and down the screw thread to raise and lower a support 26 which is square in form and has a hollow opening for the top for the screw. This is supported in a square opening in the top of the frame of the jack and is adapted to be secured in adjusted position by a set screw 27. This support is provided with a cylindrical passage 28 for receiving the pin 15 or 18. When the jack is to be used it is put under the car and this passage receives the pin so that the jack is pivoted to the bracket to swing about the pin as a center.

I also use a wedge or block 30 having a slanting upper surface for receiving and supporting the wheel. The wheel is intended to be rolled up this surface for the purpose of getting the wheel up off the ground and allowing the jack to act. This block or wedge is shown in several of the figures as comprising two parts pivoted together at 31 and having a right and left hand screw 32 for adjusting its height. In Fig. 12 I have shown another form of wedge consisting of two parts 33 and 34 with teeth or undulations 35 between them. When in the position shown in Fig. 12, this wedge is in its lowest elevation but if the upper part is lifted or moved along a little, the top of the wedge will be considerably higher.

In the use of the device to lift the rear wheel of a car, the jack is applied to the pin 15 in the manner shown in Fig. 7 and the wedge placed under the wheel. Now as the car moves forwardly, this being the rear wheel, the tire will go up the incline of the wedge and the wheels 23 will roll along the ground without resistance but whenever the axle gets high enough so that the wheels are lifted off the ground the jack will depend by gravity from its pivot. It will stay in that position until the tire rolls off the high end of the wedge. Now when the wheel drops down the jack will be under the axle and will support the wheel elevated from the ground, as shown in Fig. 9. This is all the action there is in lifting one of the rear wheels.

When it is desired to release the car from the jack, the wedge is turned around end for end, as shown in Fig. 10, and the car moves backward as indicated by the arrows so as to lift the wheel higher again. This causes the jack first to be lifted off the ground and to depend from the axle the same as before. Then when the wheel drops off the wedge the wheels 23 will support the forward end of the base of the jack and hold it back so that it will come to the inclined position indicated in Fig. 7.

In applying this jack to the front wheel, the two wheels 23 are not employed nor the wedge. In this case the jack is put on one of the pins 18, as shown in Fig. 11, and the car moved forward. Now the effect of this is merely to tip the jack over its projecting point 21 until it comes to an upright position resting on this point and the wheels. Then the jack will support the axle. In order to release it, the car is simply backed so as to swing the jack over to the position shown in Fig. 11. The wedge is not needed for the front wheels but it can be used.

It will be seen that the wedge or block is used to support the wheel and provide traction in case of the rear wheels while the car is being moved along. That is true whether they are moving forward or backward in the case of the rear wheels and whether the jack is being applied or removed. In the case of the front wheels, however, traction is not needed and the device will operate both ways without any wedge. This constitutes a very simple jack. Although it has an adjusting screw, as stated, this adjusting screw is operated only when the jack is first applied to that car, or perhaps when tires are changed from ordinary tires to oversize or balloon tires, but it is not necessary to use it ordinarily more than once or twice during its lifetime. The brackets on the front and rear axles are formed of such a length that the four pins 15 and 18 are all at the same distance from the ground so that the jack can be used in all four places without adjustments. There is no work required on the part of the operator in lifting the car and this makes it particularly desirable for heavy passenger cars and trucks. The elimination of all this work is an important matter. The ease with which the device can be applied, merely slipping it over the pin, and the ease with which the car can be raised and lowered are all important features, but the simplicity of the jack itself and the fact that it can be made so strong, comparatively light and without moving parts that are likely to get out of order, is particularly important.

Although I have illustrated and described only a single form of the invention, I am aware of the fact that modifications can be made therein by any person skilled in the art without departing from the scope of the invention as expressed in the claim.

Therefore I do not wish to be limited in these respects but what I do claim is:—

The combination with an automobile, of brackets surrounding the axles thereof near the wheels and secured in fixed position, each bracket having a horizontal pin projecting laterally therefrom at a point below each axle, a jack of solid form and triangular shape pivoted on said pin and having a vertical height greater than the distance of the pin from the ground, wheels on one corner of the base of said jack, whereby when the jack is applied to the pin under the rear axle and the car is run along up an incline in the direction towards which the jack projects, with rear wheels on the ground, the wheels of the jack will roll along the ground until the rear wheel of the vehicle is lifted to such position as to allow the jack to depend freely from its pivot pin by gravity when it will extend below the bottom of the wheel, said jack having a sharp corner at its bottom edge opposite the wheels so that it can be applied to the pin below the front axle projecting forwardly with the sharp point on the ground and the front wheel can be lifted by moving the car forward without using anything to lift the car except said jack.

In testimony whereof I have hereunto affixed my signature.

EUGENE J. McCARTY.